(12) United States Patent
Sekiya (10) Patent No.: US 8,941,769 B2
(45) Date of Patent: Jan. 27, 2015

(54) IMAGE CAPTURING APPARATUS, IMAGE DISPLAY APPARATUS, AND IMAGE DISPLAY SYSTEM

(75) Inventor: Shinnosuke Sekiya, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 13/543,473

(22) Filed: Jul. 6, 2012

(65) Prior Publication Data

US 2013/0016257 A1 Jan. 17, 2013

(30) Foreign Application Priority Data

Jul. 11, 2011 (JP) .................................. 2011-152843

(51) Int. Cl.
*H04N 5/222* (2006.01)
*H04N 5/232* (2006.01)
(52) U.S. Cl.
CPC ................................ *H04N 5/23293* (2013.01)
USPC .................................. 348/333.1; 348/207.99
(58) Field of Classification Search
None
See application file for complete search history.

(56) References Cited

U.S. PATENT DOCUMENTS

| 7,525,589 | B2 * | 4/2009 | Sasagawa | 348/333.12 |
| 7,884,873 | B2 * | 2/2011 | Shiota et al. | 348/333.01 |
| 8,654,238 | B2 * | 2/2014 | Fujinawa | 348/333.12 |
| 2005/0104909 | A1 * | 5/2005 | Okamura et al. | 345/698 |
| 2006/0126082 | A1 * | 6/2006 | Choi | 358/1.2 |
| 2011/0043663 | A1 * | 2/2011 | Tsuchiya | 348/240.3 |

FOREIGN PATENT DOCUMENTS

JP 2004-072207 A 3/2004

* cited by examiner

*Primary Examiner* — Twyler Haskins
*Assistant Examiner* — Angel L Garces-Rivera
(74) *Attorney, Agent, or Firm* — Canon USA, Inc., I.P. Division (57) ABSTRACT

A display control unit controls an image presentation unit such that when an image display apparatus displays a partial area of an image stored in an image storage unit, an image presentation unit displays a whole image stored in the image storage unit and display information indicating the partial area in the whole image.

13 Claims, 11 Drawing Sheets

IMAGE CAPTURING APPARATUS, IMAGE DISPLAY APPARATUS, AND IMAGE DISPLAY SYSTEM

BACKGROUND OF THE INVENTION

1. Field of the Invention

The present invention relates to an image capturing apparatus including an image presentation unit and an image display system that connects to an image display apparatus communicable with the image capturing apparatus.

2. Description of the Related Art

Figure 10A:
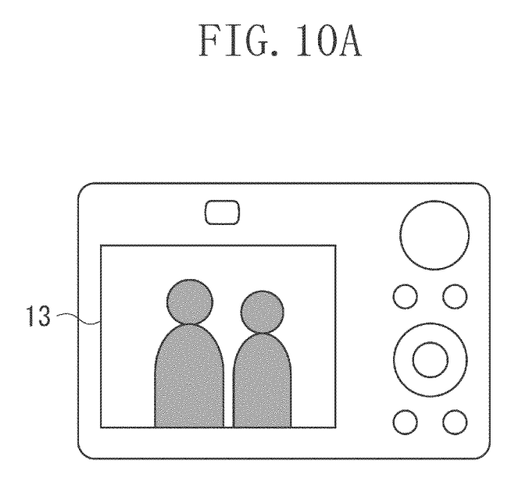
FIGS. 10A and 10B illustrate explanatory diagrams of an image reproduction operation of a conventional digital camera.
Figure 10B:
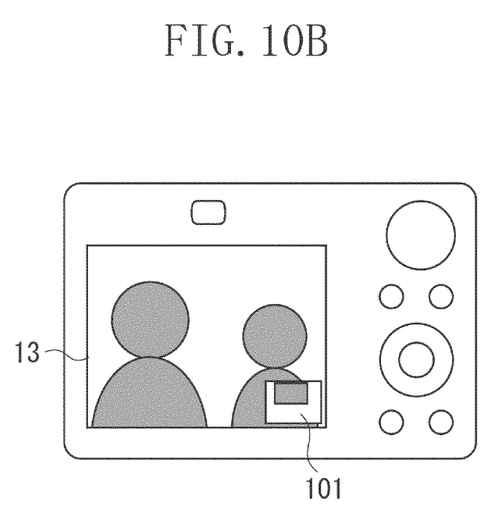

In a general image capturing apparatus, e.g., a digital camera, including a monitor as an image presentation unit, an enlarged image is displayed on the image presentation unit when an image enlargement operation is performed by digital zooming. FIGS. 10A and 10B illustrate screen display examples in the digital zooming with a conventional digital camera. A display screen 13 is an image presentation unit included in the digital camera and displaying an image. A well-known image presentation unit is a display screen capable of superimposing an on-screen display (OSD) on an image and displaying a resultant image.

FIG. 10A illustrates an example of a screen when displaying an image in the digital camera. When the image enlargement operation is performed using the digital zooming, as illustrated in FIG. 10B, an image range of an original image (whole image at the maximum angle of view) is partly enlarged and displayed. At this time, a guide screen 101 may be displayed to indicate a partial enlargement image range in the whole image range. Information drops in a region of the guide screen 101 in the displayed enlargement image due to the guide screen 101.

In addition to the conventional art, Japanese Patent Application Laid-Open No. 2004-072207 discusses a digital camera including a liquid crystal monitor as an image presentation unit. Specifically, Japanese Patent Application Laid-Open No. 2004-072207 discusses the digital camera in which a partial enlargement range with respect to the whole image range without digital zooming is set as information (frame line of an area frame, corners of an area frame, etc.) on an enlargement range when enlarging and displaying an image on a monitor with the digital zooming, and the partial enlargement range is superimposed to an enlargement image and is displayed.

However, when superimposing the guide screen on the display image and displaying the resultant image, the operation may prevent the display of an image which is essentially desired to be visually recognized. Further, as discussed in Japanese Patent Application Laid-Open No. 2004-072207, the enlargement range with respect to the whole image rage is partially displayed. However, the partial enlargement image with respect to the whole image cannot be directly recognized.

SUMMARY OF THE INVENTION

The present invention is directed to providing an image capturing apparatus capable of recognizing a partial area image with respect to the whole image, displayed on an image display apparatus, while directly keeping the visibility and an image display system.

According to an aspect of the present invention, an image capturing apparatus includes an image capturing unit configured to capture an image of a subject, an image sensor configured to form the image of the subject with the image capturing unit, an image storage unit configured to store the image, an image presentation unit configured to enable presenting the image, a transmission unit configured to transmit image information to an external image display apparatus, and a display control unit configured, when displaying a partial area of the image stored in the image storage unit on the image display apparatus, to control the image presentation unit to display a whole image stored in the image storage unit by the image presentation unit and display information indicating the partial area in the whole image. The transmission unit is configured to transmit to the external image display apparatus the image information and range information for displaying the partial area by the external image display apparatus.

According to another aspect of the present invention, an image display system includes the image capturing apparatus and the image display apparatus.

According to yet another aspect of the present invention, an image display apparatus communicable with an image capturing apparatus includes a reception unit configured to receive an image and range information for displaying a partial area of the image from the image capturing apparatus, and a display unit configured to clip out and display the received image based on the received range information.

According to the present invention, it is possible to display information indicating a partial area displayed on an image display apparatus together with the whole image stored in an image storage unit on an image presentation unit, and recognize the partial area image with respect to the whole image displayed on the image display apparatus while directly keeping the visibility.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
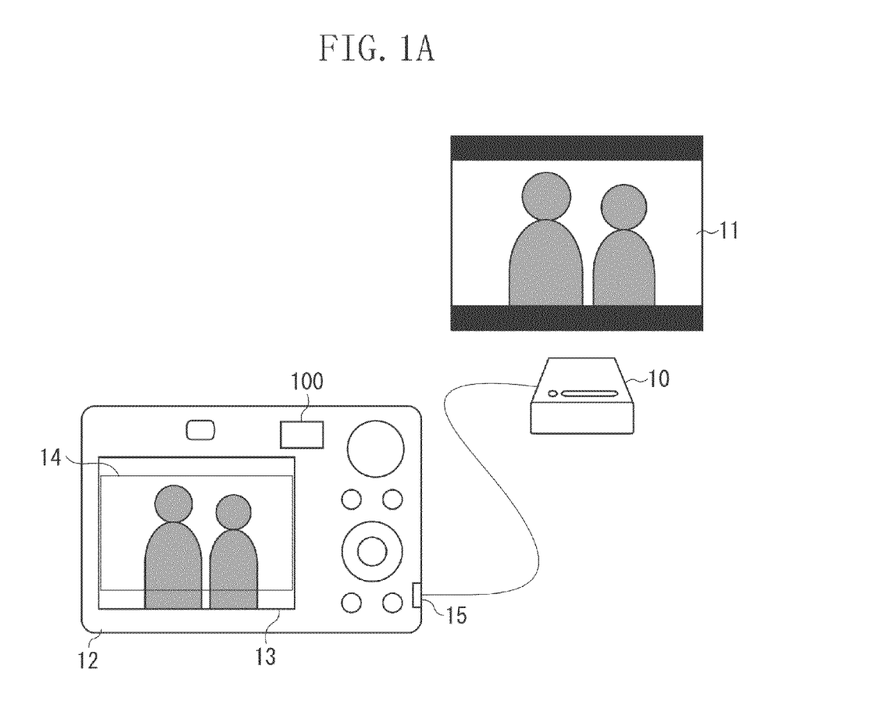
FIG. 1A illustrates an explanatory diagram of an image display system obtained by combining a digital camera as an image capturing apparatus and a projector.
Figure 1B:
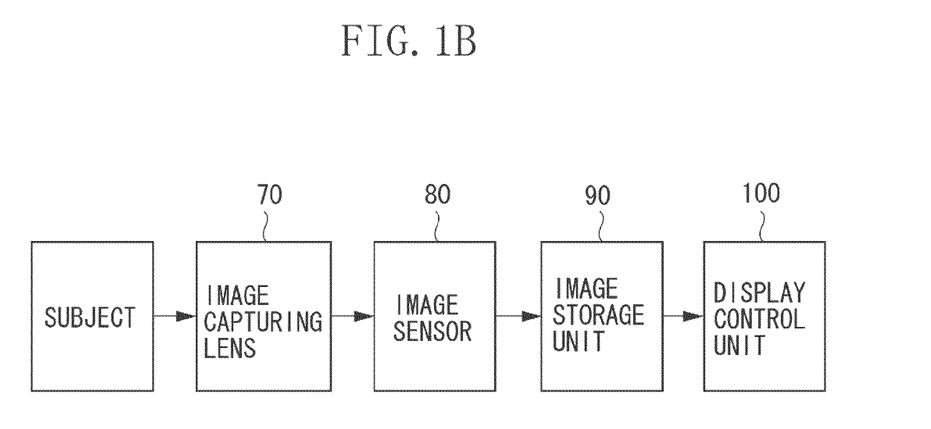
FIG. 1B illustrates a functional block diagram of the digital camera according to a first exemplary embodiment of the present invention.

A first exemplary embodiment of the present invention will be described. Hereinbelow, a description will be given of an operation of an image display system in which a digital camera is connected to a projector with reference to FIG. 1A and FIG. 1B illustrating functional blocks of the digital camera according to the first exemplary embodiment of the present invention. A projector 10 is mutually connected to a digital camera 12 including an image capturing lens 70 that captures an image of a subject, an image sensor 80 such as a charge coupled device (CCD) that forms the image, an image storage unit 90, and a display control unit 100 via a communication unit (transmission and reception unit) 15.

The digital camera 12 transmits image information (the whole image data stored in the image storage unit 90) capable of being presented on a display screen 13 of a monitor as an image presentation unit to the projector 10 via the communication unit 15. According to the present exemplary embodiment, it is assumed that the image size is not changed. Therefore, an image at a maximal angle of view is always captured. According to the present exemplary embodiment, the projector 10 transmits range information on an aspect ratio matching with a screen aspect (e.g., 16:9) in progress of setting with the projector 10 to the digital camera 12.

In the digital camera 12, the display control unit 100 displays, with a frame, a range 14 displayed by the projector 10 on the display screen 13 as the image presentation unit with a different screen aspect (e.g., 4:3) to keep the visibility in the whole image stored in the image storage unit 90. In addition to displaying the frame of the range 14 displayed by the projector 10 on the display screen 13, the range 14 may be performed image processing such as hatching and displayed as a display image capable of keeping the visibility of the superimposed whole image. In the frame display, a frame line may be displayed with a broken line as well as a solid line. Alternatively, the frame line may be used with color display such as red or yellow as well as a black line or a white line. Alternatively, only four corners may be displayed as a frame in place of the frame line.

The digital camera 12 transmits the range information of the range 14 to the projector 10 via the communication unit 15. The instructed projector 10 clips out an image indicated by the range 14, from the previously received whole image data, and projects and displays the clip-out image.

With the configuration, an image display range of the projector 10 with respect to the whole image range is displayed on the display screen 13 as the image presentation unit in the digital camera 12 while keeping the visibility of the whole image stored in the image storage unit 90. As a consequence, a display range and a display image of the projector 10 can be directly recognized.

According to the present exemplary embodiment, the communication unit as a physical cable is illustrated. Obviously, another communication unit or method, such as radio communication, may be applied according to the present exemplary embodiment.

Figure 2:
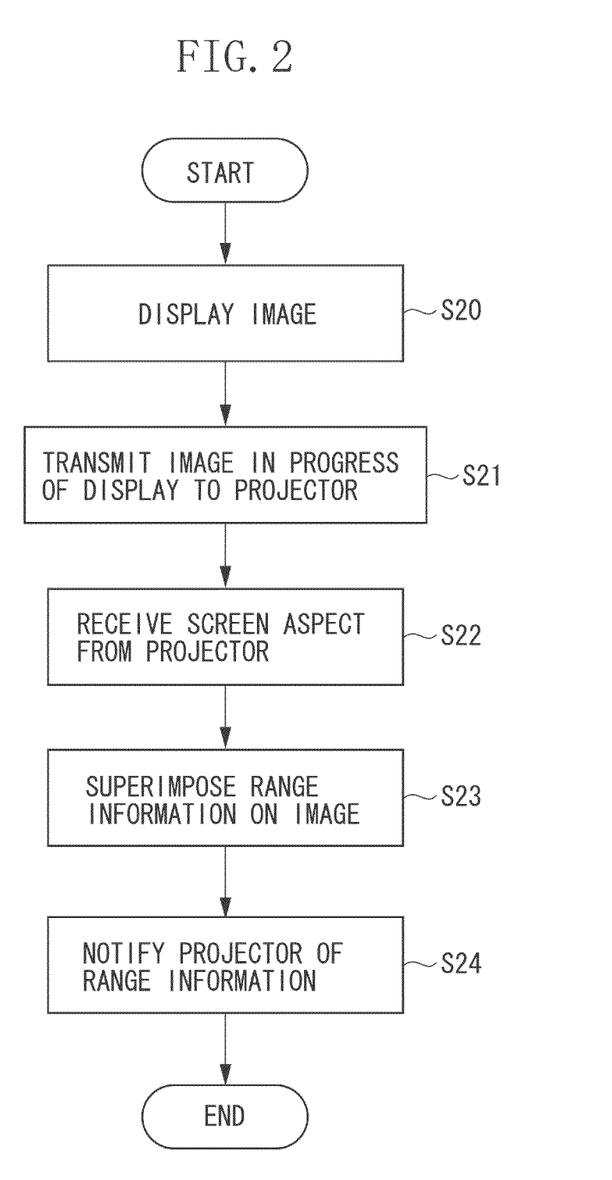
FIG. 2 illustrates a flowchart of an operation of the digital camera according to the first exemplary embodiment of the present invention.

FIG. 2 illustrates a flowchart of an operation of the digital camera 12 when connected to the projector 10 according to the present exemplary embodiment. In step S20, the display control unit 100 displays an image. Specifically, the display control unit 100 displays image data stored in the image storage unit 90 in the digital camera 12 or an external storage unit on the display screen 13 as the image presentation unit. In step S21, the display control unit 100 transmits the image. Specifically, the display control unit 100 transmits the image in progress of display on the digital camera 12 to the projector 10. In step S22, the display control unit 100 receives the screen aspect. Specifically, the display control unit 100 receives the image area information matching with the screen aspect set on the projector 10.

In step S23, the display control unit 100 superimposes the range information on the image. Specifically, the display control unit 100 superimposes the range information indicating a predetermined area with the aspect ratio matching with the aspect ratio of the projector 10 received in step S22 as the screen aspect reception step on the image in progress of display on the digital camera 12 and then displays. In step S24, the display control unit 100 performs notification of the range information. Specifically, the display control unit 100 notifies the projector 10 of the range based on the range information displayed in step S23. The projector 10 clips out an area matching with the range received in step S24 from the received image, and displays the clip-out area.

The range area designated in step S23 matches with the screen aspect in progress of setting by the projector 10. Therefore, the projector 10 can perform displaying while keeping the aspect ratio of the subject a display format of the projector main body.

A second exemplary embodiment will be described. A description will be given of an operation of an image display system including a digital camera and a projector according to the present exemplary embodiment with reference to FIGS. 3 and 4. According to the present exemplary embodiment, unlike the first exemplary embodiment, the image size or the image position on the projector can be changed, in other words, can be zoomed or be displaced.

Figure 3:
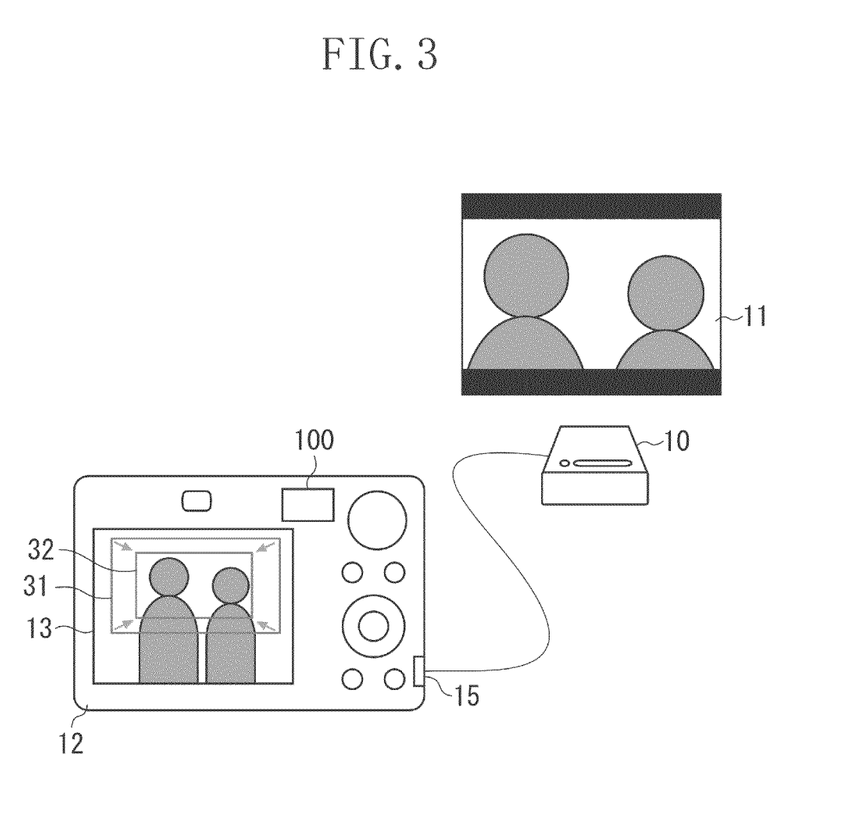
FIG. 3 illustrates an explanatory diagram of change (zooming) of an image size of an image display system obtained by combining a digital camera as an image capturing apparatus and a projector according to a second exemplary embodiment of the present invention.

Referring to FIG. 3, a first image range 31 is displayed on a projector 10. When an enlargement operation using digital zooming is performed in a digital camera 12, an image on a display screen 13 as an image presentation unit is not enlarged, instead the size of the range information is changed as an image range 32. The projector 10 displays the image range 32.

Figure 4:
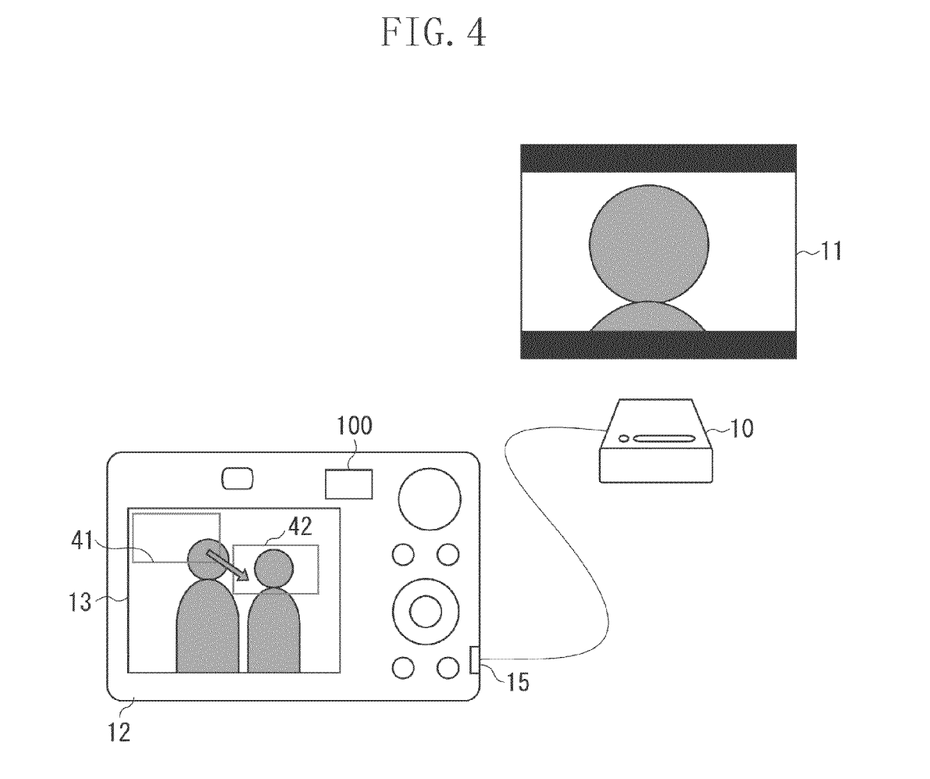
FIG. 4 illustrates an explanatory diagram of change (displacement) of an image position of the image display system obtained by combining the digital camera as the image capturing apparatus and the projector according to the second exemplary embodiment of the present invention.

Referring to FIG. 4, a first image range 41 is displayed on the projector 10. In the digital camera 12, displacement in the vertical and horizontal directions is instructed with a directional operation using a cross button. Then, range information displayed by the projector 10 moves in the display screen 13. The range after the movement is indicated by an image range 42 and the projector 10 displays the image range 42.

The image range 42 is changed with the operation on the side of the digital camera 12. Then, the digital camera 12 transmits information on the image range to the projector 10 via the communication unit 15. The projector 10 clips out an image corresponding to the transmitted image range from the whole image data that is previously received and projects and displays the clip-out image.

The enlargement/reduction and movement of the range information may be instructed via the communication unit 15 from the side on the projector 10 in place of the side of the digital camera 12.

According to the present exemplary embodiment, the range displayed by the projector 10 with respect to the whole image range can be instructed to arbitrary zoom (enlarge/reduce) or displace on the display screen 13 as the image presentation unit in the digital camera 12. Every time when the range is instructed, the projector 10 clips out the instructed range (area), and projects and displays the clip-out range. With the configuration, a user visually recognizes the whole image on the display screen 13 as the image presentation unit in the digital camera 12 with a display control unit 100, designates a display range displayed by the projector 10, and confirms the display range and the display image displayed by the projector 10.

Figure 5:
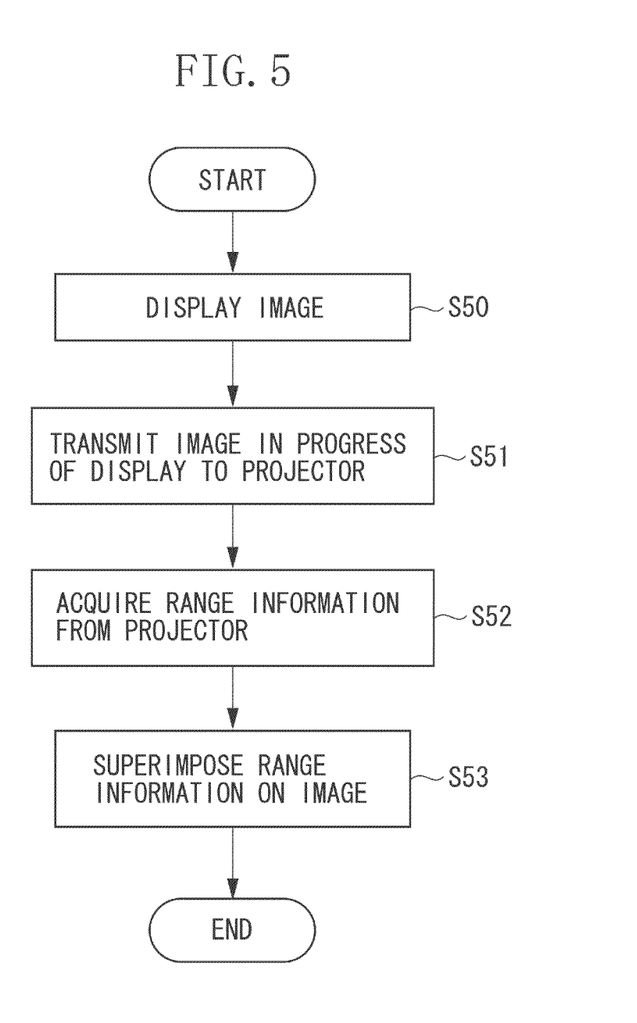
FIG. 5 illustrates a flowchart of an operation of the digital camera according to the second exemplary embodiment of the present invention.

A description will be given of an operation of the digital camera 12 according to the present exemplary embodiment with reference to FIG. 5. According to the present exemplary embodiment, the digital camera 12 can communicate (transmit or receive data according to the present exemplary embodiment) with the projector 10 as an external image display apparatus. Referring to FIG. 5, in step S50, the display control unit 100 displays an image. Specifically, the display control unit 100 displays the whole image data at a maximum angle of view stored in the digital camera 12 or in the external image storage unit 90 on the display screen 13 as the image presentation unit. In step S51, the display control unit 100 transmits the image. Specifically, the display control unit 100 transmits the image in progress of display on the digital camera 12 to the projector 10.

In step S52, the display control unit 100 acquires the range information. Specifically, the display control unit 100 acquires information on a partial image range displayed on the projector 10 therefrom. In step S53, the display control unit 100 superimposes the range information on the image. Specifically, the display control unit 100 superimposes the image range acquired in the range information acquisition step S52 on the image in progress of display on the display screen 13 as the image presentation unit in the digital camera 12 and then displays. With the configuration, when changing and displaying the image size or the image position with an operation on the side of the digital camera 12 or the projector 10, in step S53, the area displayed by the projector 10 can be indicated as the range information on the display image of the digital camera 12.

A third exemplary embodiment will be described. A description will be given of an operation of a projector 10 in an image display system in which information on the image size or the image position can be transmitted to the side of the projector 10 from the side of a digital camera 12 according to the present exemplary embodiment with reference to FIG. 6. According to the present exemplary embodiment, the digital camera 12 can communicate (transmit and receive data according to the present exemplary embodiment) with the projector 10 as an external image display apparatus. Whole image data (stored in an image storage unit 90) 60 is transmitted from the digital camera 12 to the projector 10 at a maximum angle of view. An image rage 61 is notified from the digital camera 12 to the projector 10.

Figure 6:
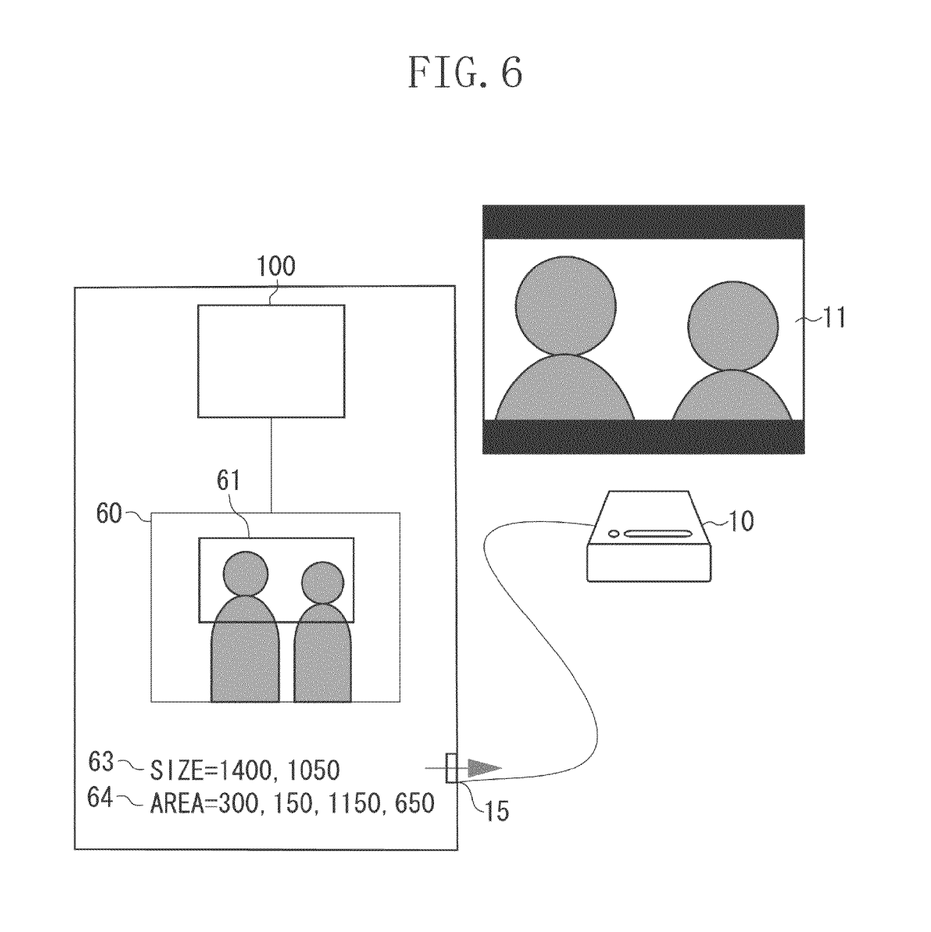
FIG. 6 illustrates an explanatory diagram of an image display system obtained by combining a digital camera as an image capturing apparatus and a projector according to a third exemplary embodiment of the present invention.

The projector 10 receives image data from the digital camera 12 via a communication unit 15. Further, the projector 10 receives image size information 63 and image position information 64. The image size information 63 indicates the whole image information, with 1400 pixels in the horizontal direction and 1050 pixels in the vertical direction when the upper left corner in the whole image data area 60 in FIG. 6 is the origin. The range information 64 displayed by the projector 10 indicates a 300-th pixel on the left side and a 1150-th pixel on the right side in the horizontal direction of the image area and a 150-th pixel on the up side and a 650-th pixel on the down side in the vertical direction when the upper left corner is the origin.

The projector 10 clips out an area matching with the range of the image position information 64 of the received whole image, and displays the clip-out area on a projection screen 11. In the digital camera 12, a projector display range indicated by the image position information 64 is displayed together with the whole image on the image presentation unit in the digital camera 12 with a display control unit 100. The communication systems using the image size information 63 and the image position information 64 are examples and can be changed in a range without departing from the meaning.

Figure 7:
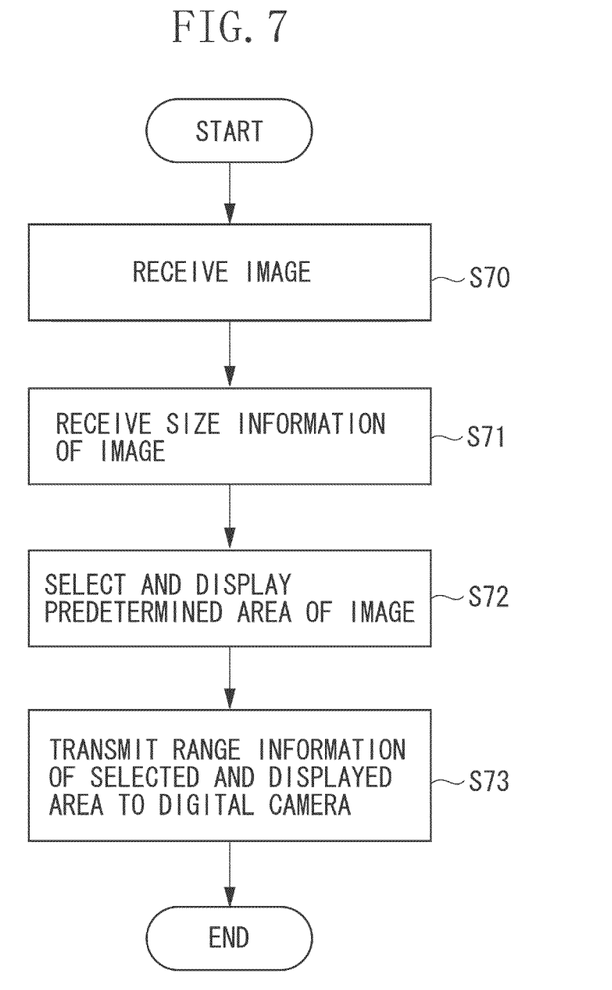
FIG. 7 illustrates a flowchart of an operation of the projector according to the third exemplary embodiment of the present invention.

A description will be given of an operation of the projector 10 according to the present exemplary embodiment with reference to FIG. 7. In step S70, an image is received, specifically, the whole image data at the maximum angle of view is received from the digital camera 12 via the communication unit 15. In step S71, the image size information 63 is received, specifically, information indicating the size of the image acquired in step S70 is received. In step S72, a predetermined area of the image is selected and displayed, specifically, a predetermined area in the whole image acquired in the image reception step S70 is selectively displayed. For example, an electronic zooming function of the projector 10 corresponds to this. When displaying the whole image, the whole image is equally used as being selectively displayed.

In step S73, the range information is transmitted, specifically, information indicating the image range selectively displayed in step S72 is transmitted to the digital camera 12. On the side of the digital camera 12, the information received in step S73 enables the digital camera 12 to know which area the projector 10 displays. On a display screen 13 as an image presentation unit in the digital camera 12, the image range displayed by the projector 10 is displayed with a frame line together with the whole image.

Figure 8:
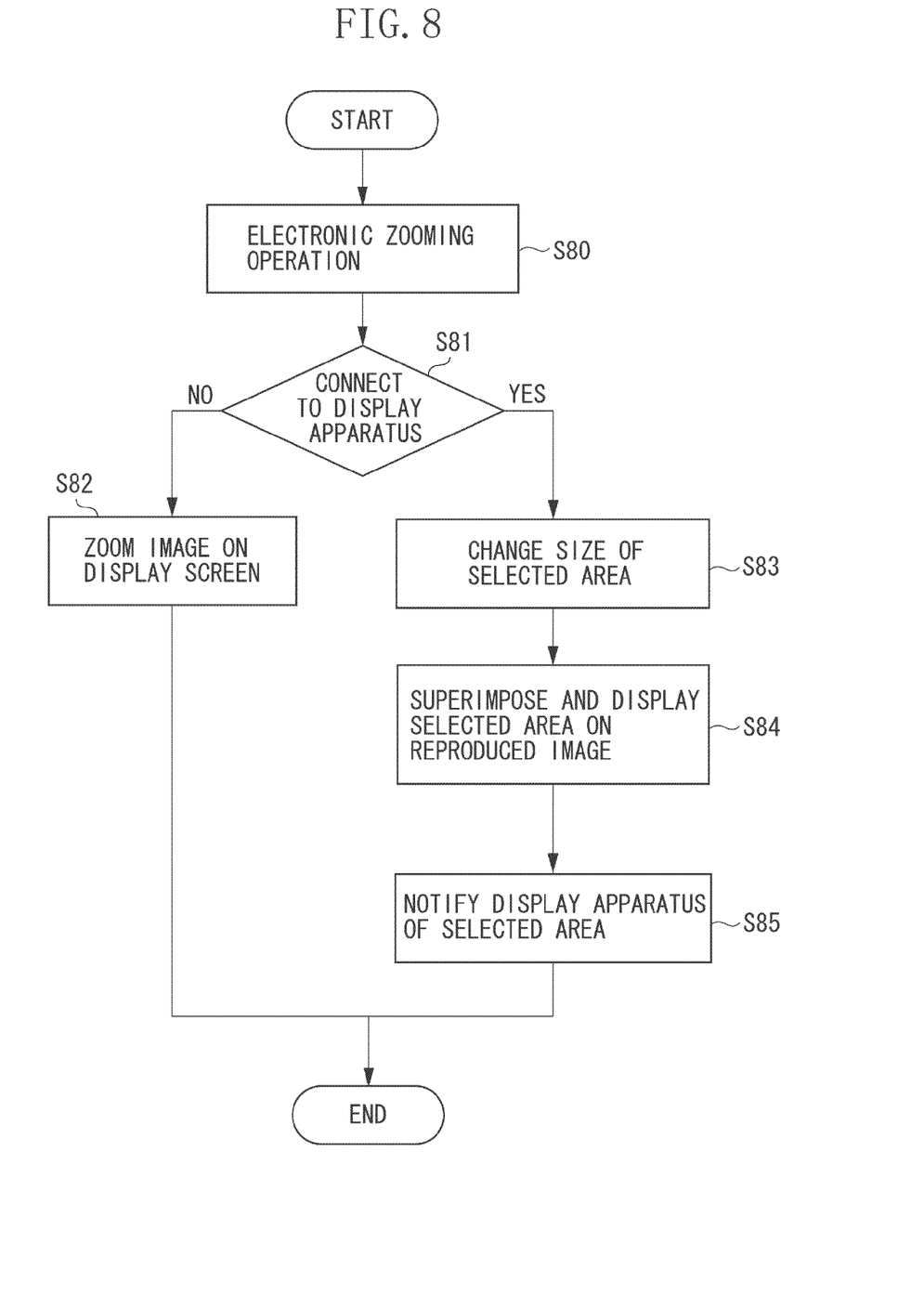
FIG. 8 illustrates a flowchart of an operation of a digital camera in an image display system obtained by combining the digital camera as an image capturing apparatus and a projector according to a fourth exemplary embodiment of the present invention.
Figure 9A:
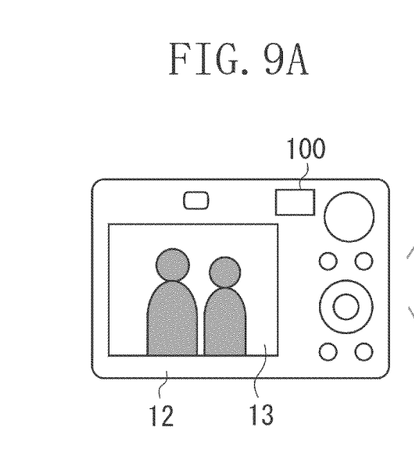
FIGS. 9A to 9C illustrate explanatory diagrams indicating whether it is communicable with a display device according to the fourth exemplary embodiment of the present invention.
Figure 9B:
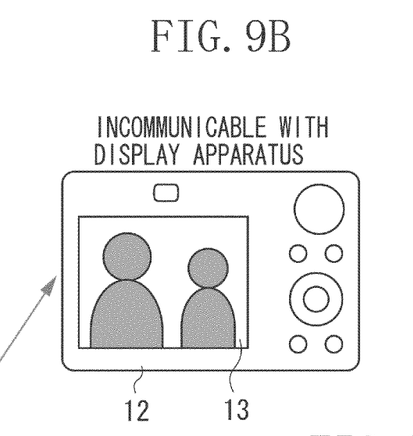
Figure 9C:
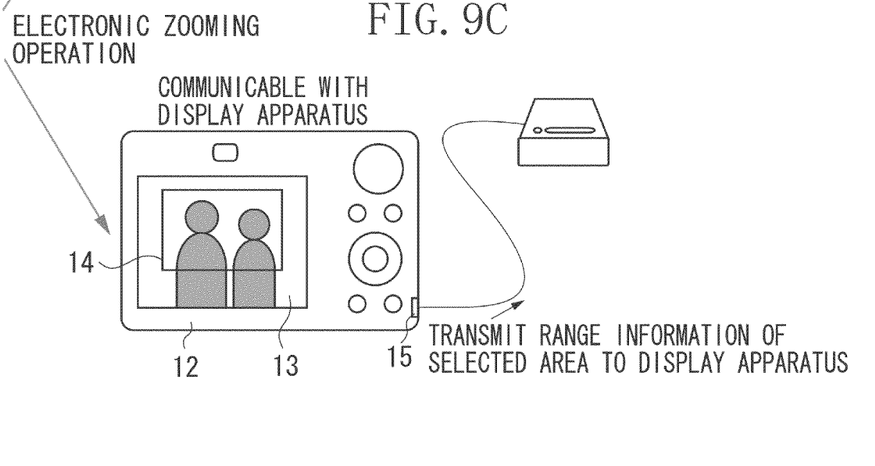

A fourth exemplary embodiment will be described. A description will be given of an operation of a digital camera 12 in an image display system for determining whether connection to an external image display apparatus is established with reference to FIGS. 8 and 9A to 9C according to the present exemplary embodiment. FIG. 8 illustrates an operation sequence of an image with an electronic zooming operation of the digital camera 12. FIGS. 9A to 9C schematically illustrate user interfaces in a series of operations in FIG. 8.

Referring to FIG. 8, in step S80, an operator performs an electronic zooming operation, specifically, the operator performs an operation of an electronic zooming member. When the digital camera 12 is not connected to the image display apparatus, the operator operates a member for enlarging the image and changing the position of the image on a display screen 13 as an image presentation unit in the digital camera 12. When the operation is performed, the processing proceeds to step S81. In step S81, the display control unit 100 determines a communication state with the image display apparatus, specifically, the display control unit 100 determines whether the digital camera 12 can be communicated with the image display apparatus. Any format may be used for communication determined in step S81, e.g., a wiring manner may be used or a wireless manner may be used.

If the display control unit 100 determines that the digital camera cannot be communicated with the image display apparatus (NO in step S81), the processing proceeds to image zooming in step S82. If the operator performs an image enlargement operation in step S80, in step S82, the display control unit 100 increases an image enlargement ratio. If the operator performs an image reduction operation in step S80, the display control unit 100 performs processing for reducing the image enlargement ratio and displays the image after the zooming processing on a display screen 13 in the digital camera 12. Referring to FIG. 9B, the image (enlarged image with the enlargement operation) after the zooming processing is displayed on the display screen 13 in the digital camera 12.

If the display control unit 100 determines that the digital camera 12 can be communicated with the image display apparatus (YES in step S81), the processing proceeds to a selected area range change step S83. In step S83, the display control unit 100 enlarges, reduces, or moves a range of a predetermined area for notification to the image display apparatus according to the operation in step S80. In step S84, a display control unit 100 superimposes the projector display range to the displayed whole image and displays the superimposed range on the image presentation unit in the digital camera 12 while keeping the visibility of the whole image in order to visually show the predetermined selected area in step S83 to the operator.

Referring to FIG. 9C, the whole image (stored in an image storage unit 90) at the maximum angle of view is displayed without zooming on the display screen 13 as the image presentation unit in the digital camera 12, and the projector display range 14 is superimposed on the whole image and the resultant image is displayed. Subsequently to step S84, the processing proceeds to the selected area notification step S85. In step S85, the display control unit 100 transmits the range information matching with the changed predetermined area as a result of the operation to the image display apparatus. The image display apparatus that receives the range information selectively displays the area corresponding to the received range information of the whole image. With the operation similar to the electronic zooming operation in FIG. 9B, a selected partial range is enlarged and displayed on the display screen 13 of the projector 10 as the image display apparatus.

On the display screen 13 as the image presentation unit in the digital camera 12, it is possible to confirm the whole image together with the display range that is enlarged and displayed in the image display apparatus.

The exemplary embodiments of the present invention are described. However, the present invention is not limited to the exemplary embodiments, and can be modified and changed within a range of the essential.

A first modification will be described. A description will be given as an example by using a digital camera 12 as an image capturing apparatus and a projector 10 as an image display apparatus. Further, the present invention can be applied to an image capturing apparatus (e.g., video camera) other than the digital camera 12, or an image display apparatus (e.g., monitor of a personal computer) other than the projector 10.

A second modification will be described. According to the exemplary embodiments, the screen aspect is different between the projector 10 and the digital camera 12. However, the screen aspect may be identical therebetween according to the present invention.

A third modification will be described. According to the first exemplary embodiment, in step 22, the digital camera 12 can receive the information on the screen aspect from the projector 10 as the external image display apparatus. When the screen aspect is recognized in advance by the digital camera 12, the operation in step 22 can be omitted.

A fourth modification will be described. According to the third exemplary embodiment, the digital camera 12 can transmit and receive data to the projector 10 as an external image display apparatus. Alternatively, the digital camera 12 can be formed in a communication format only for transmitting data. In this case, in step S73, the digital camera 12 can notify the image providing unit of the image range information transmitted to the projector 10 in step S71, in place of transmitting the projector display range to the digital camera 12 from the projector 10. Thus, the operator can visually recognize the projector display range together with the whole image on the image providing unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-152843 filed Jul. 11, 2011, which is hereby incorporated by reference herein in its entirety.

What is claimed is:

1. An image capturing apparatus comprising:
   an image capturing unit configured to capture an image of a subject;
   an image sensor configured to receive the image of the subject;
   an image storage unit configured to store the image;
   an image presentation unit configured to enable presenting the image;
   a transmission unit configured to transmit whole image data corresponding to a whole image received by the image sensor to an image display apparatus; and
   a display control unit configured, when displaying a partial area of the image stored in the image storage unit on the image display apparatus, to control the image presentation unit to display a the whole image stored in the image storage unit by the image presentation unit and display information indicating the partial area in the whole image,
   a reception unit configured to receive a screen aspect displayed by the image display apparatus,
   wherein the transmission unit is configured to transmit to the image display apparatus the whole image data and range information for displaying the partial area by the image display apparatus,
   wherein the display control unit is configured to display a partial image range matching with the screen aspect together with the whole image, and
   wherein the transmission unit is configured to transmit image area information matching with the screen aspect as the range information to the image display apparatus.

2. The image capturing apparatus according to claim 1, further comprising a changing unit configured to change an image size or an image position displayed by the image display apparatus.

3. The image capturing apparatus according to claim 1, wherein the screen aspect displayed by the image display apparatus is different from the screen aspect of the image presentation unit.

4. The image capturing apparatus according to claim 1, further comprising a communication state determination unit configured to determine whether it is communicable with the image display apparatus, wherein the display control unit is configured, when determining that it is not communicable with the image display apparatus, not to display the whole image.

5. The image capturing apparatus according to claim 1, wherein the display control unit is configured to display a range of the image displayed by the image display apparatus, as a frame.

6. An image display system comprising:
an image capturing apparatus; and
an image display apparatus,
wherein the image capturing apparatus comprises:
an image capturing unit configured to capture an image of a subject;
an image sensor configured to form the image of the subject with the image capturing unit;
an image storage unit configured to store the image;
an image presentation unit configured to enable presenting the image;
a transmission unit configured to transmit whole image data corresponding to a whole image received by the image sensor to the image display apparatus; and
a display control unit configured, when the image display apparatus displays a partial area of the image stored in the image storage unit, to control the image presentation unit to display the whole image stored in the image storage unit by the image presentation unit and display information indicating the partial area in the whole image, and
a reception unit configured to receive a screen aspect displayed by the image display apparatus,
wherein the transmission unit is configured to transmit the whole image data and range information for displaying the partial area by the image display apparatus,
wherein the display control unit is configured to display a partial image range matching with the screen aspect together with the whole image, and
wherein the transmission unit is configured to transmit image area information matching with the screen aspect as the range information to the image display apparatus.

7. An image display apparatus communicable with an image capturing apparatus,
wherein the image capturing apparatus comprises:
an image capturing unit configured to capture an image of a subject;
an image sensor configured to receive the image of the subject;
an image storage unit configured to store the image;
an image presentation unit configured to enable presenting the image;
a transmission unit configured to transmit whole image data corresponding to a whole image received by the image sensor to an image display apparatus; and
a display control unit configured, when displaying a partial area of the image stored in the image storage unit on the image display apparatus, to control the image presentation unit to display a the whole image stored in the image storage unit by the image presentation unit and display information indicating the partial area in the whole image,
a reception unit configured to receive a screen aspect displayed by the image display apparatus,
wherein the transmission unit is configured to transmit to the image display apparatus the whole image data and range information for displaying the partial area by the image display apparatus,
wherein the display control unit is configured to display a partial image range matching with the screen aspect together with the whole image, and
wherein the transmission unit is configured to transmit image area information matching with the screen aspect as the range information to the image display apparatus,
wherein the image display apparatus comprises:
a reception unit configured to receive the whole image data and area information indicating an area to be displayed of the whole image from the image capturing apparatus; and
a display unit configured to clip out and display a part of the received whole image data based on the received area information.

8. An image display system comprising:
an image capturing apparatus and an image display apparatus,
wherein the image capturing apparatus comprises:
an image capturing unit configured to capture an image of a subject;
an image sensor configured to receive the image of the subject;
an image storage unit configured to store the image;
an image presentation unit configured to enable presenting the image;
a transmission unit configured to transmit whole image data corresponding to a whole image received by the image sensor to an image display apparatus; and
a display control unit configured, when displaying a partial area of the image stored in the image storage unit on the image display apparatus, to control the image presentation unit to display the whole image stored in the image storage unit by the image presentation unit and display information indicating the partial area in the whole image,
a reception unit configured to receive a screen aspect displayed by the image display apparatus,
wherein the transmission unit is configured to transmit to the image display apparatus the whole image data and range information for displaying the partial area by the image display apparatus,
wherein the display control unit is configured to display a partial image range matching with the screen aspect together with the whole image, and
wherein the transmission unit is configured to transmit image area information matching with the screen aspect as the range information to the image display apparatus,
wherein the image display apparatus comprises:
a reception unit configured to receive the whole image data and area information indicating an area to be displayed of the whole image from the image capturing apparatus; and
a display unit configured to clip out and display a part of the received whole image data based on the received area information.

9. An image capturing apparatus comprising:
an image capturing unit configured to capture an image of a subject;
an image sensor configured to receive the image of the subject;
an image storage unit configured to store the image;
an image presentation unit configured to enable presenting the image;
a transmission unit configured to transmit image information to an image display apparatus;
a display control unit configured, when displaying a partial area of the image stored in the image storage unit on the image display apparatus, to control the image presentation unit to display a whole image stored in the image storage unit by the image presentation unit and display information indicating the partial area in the whole image; and a reception unit configured to receive a screen aspect displayed by the image display apparatus, wherein the transmission unit is configured to transmit to the image display apparatus the image information and range information for displaying the partial area by the image display apparatus, wherein the display control unit is configured to display a partial image range matching with the screen aspect together with the whole image, and wherein the transmission unit is configured to transmit image area information matching with the screen aspect as the range information to the image display apparatus.

10. The image capturing apparatus according to claim 9, wherein the screen aspect displayed by the image display apparatus is different from the screen aspect of the image presentation unit.

11. An image display system comprising:
an image capturing apparatus; and
an image display apparatus,
wherein the image capturing apparatus comprises:
an image capturing unit configured to capture an image of a subject;
an image sensor configured to form the image of the subject with the image capturing unit;
an image storage unit configured to store the image;
an image presentation unit configured to enable presenting the image;
a transmission unit configured to transmit image information to an image display apparatus;
a display control unit configured, when the image display apparatus displays a partial area of the image stored in the image storage unit, to control the image presentation unit to display a whole image stored in the image storage unit by the image presentation unit and display information indicating the partial area in the whole image; and
a reception unit configured to receive a screen aspect displayed by the image display apparatus,
wherein the transmission unit is configured to transmit the image information and range information for displaying the partial area by the image display apparatus,
wherein the display control unit is configured to display a partial image range matching with the screen aspect together with the whole image, and
wherein the transmission unit is configured to transmit image area information matching with the screen aspect as the range information to the image display apparatus.

12. An image display apparatus communicable with an image capturing apparatus,
wherein the image capturing apparatus comprises:
an image capturing unit configured to capture an image of a subject;
an image sensor configured to receive the image of the subject;
an image storage unit configured to store the image;
an image presentation unit configured to enable presenting the image;
a transmission unit configured to transmit image information to an image display apparatus;
a display control unit configured, when displaying a partial area of the image stored in the image storage unit on the image display apparatus, to control the image presentation unit to display a whole image stored in the image storage unit by the image presentation unit and display information indicating the partial area in the whole image; and
a reception unit configured to receive a screen aspect displayed by the image display apparatus,
wherein the display control unit is configured to display a partial image range matching with the screen aspect together with the whole image,
wherein the transmission unit is configured to transmit image area information matching with the screen aspect as the range information to the image display apparatus,
wherein the transmission unit is configured to transmit to the image display apparatus the image information and range information for displaying the partial area by the image display apparatus, and
wherein the image display apparatus comprises:
a reception unit configured to receive the whole image data and area information indicating an area to be displayed of the whole image from the image capturing apparatus; and
a display unit configured to clip out and display a part of the received whole image data based on the received area information.

13. An image display system comprising an image capturing apparatus and an image display apparatus,
wherein the image capturing apparatus comprises:
an image capturing unit configured to capture an image of a subject;
an image sensor configured to receive the image of the subject;
an image storage unit configured to store the image;
an image presentation unit configured to enable presenting the image;
a transmission unit configured to transmit image information to an image display apparatus;
a display control unit configured, when displaying a partial area of the image stored in the image storage unit on the image display apparatus, to control the image presentation unit to display a whole image stored in the image storage unit by the image presentation unit and display information indicating the partial area in the whole image; and
a reception unit configured to receive a screen aspect displayed by the image display apparatus,
wherein the display control unit is configured to display a partial image range matching with the screen aspect together with the whole image,
wherein the transmission unit is configured to transmit image area information matching with the screen aspect as the range information to the image display apparatus,
wherein the transmission unit is configured to transmit to the image display apparatus the image information and range information for displaying the partial area by the image display apparatus,
wherein the image display apparatus comprises:
a reception unit configured to receive the whole image data and area information indicating an area to be displayed of the whole image from the image capturing apparatus; and
a display unit configured to clip out and display a part of the received whole image data based on the received area information.

* * * * *